United States Patent Office 2,901,484
Patented Aug. 25, 1959

2,901,484

BIS-QUINOLINIUMS

Richard U. Schock, Waukegan, Ill., assignor to Abbott Laboratories, North Chicago, Ill., a corporation of Illinois No Drawing. Application March 4, 1957
Serial No. 643,494

10 Claims. (Cl. 260—286)

This invention relates to novel chemical compounds and specifically to a class of quaternary ammonium salts in which quaternization occurs on a nuclear nitrogen atom.

The particular compounds of this invention are quaternized bis-quinolines corresponding to the following formula

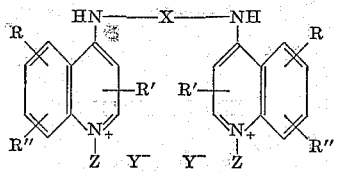

wherein X is an alkylene group having from 2 to 12 carbon atoms, phenyl, cyclohexyl or —$CH_2CHOH$—$CH_2$—; R is hydrogen, lower alkoxy or halogen in the 5, 6, 7 or 8 position; R' is hydrogen or lower alkyl in the 2 or 3 position; R" is hydrogen, halogen or lower alkoxy in the 5, 6, 7 or 8 position but in a different position from R; Z is a lower alkyl group and Y is an anion, for example an anion derived from an inorganic acid, e.g., a halogen (as chlorine, bromine or iodine), sulfate, phosphate and the like, an anion derived from a low molecular weight carboxylic acid, as a propionate, benzoate and the like, an anion derived from a sulfate ester as methylsulfate or a sulfonate, e.g., p-toluenesulfonate.

The compounds above described are active against Trypanosoma and particularly against *T. congolensi* and *T. gambiense*.

The foregoing compounds are usually prepared from free bases of the formula

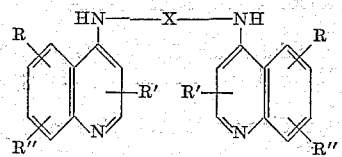

wherein the symbols are as described in the preceding paragraphs. Quaternization is effected by heating the base with a quaternizing compound such as an alkyl sulfate or lower alkyl halide.

According to another method the quaternized bis-quinolines of this invention may be prepared by reacting a quaternized quinoline of the following formula

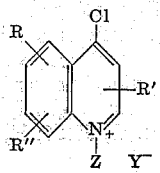

wherein the symbols are as previously described, with a polymethylenediamine in the presence of phenol. The quinoline may be quaternized simply by heating the base with a quaternizing agent such as a lower alkyl halide or sulfate.

The nuclear quaternized salts of this invention are made from the following representative bases, and other bases falling within the scope of the generic formula on page 1, by the herein described methods:

N,N' - bis - (5,8 - dimethoxy - 4 - quinaldyl) - 1,6-hexanediamine.

N,N' - bis - (5 - chloro - 8 - methoxy - 4 - quinaldyl)-1,6-hexanediamine.

N,N'-bis-(4-quinaldyl)-1,6-hexanediamine.

N,N' - bis - (6 - ethoxy - 4 - quinaldyl) - 1,6 - hexanediamine.

N,N' - bis - (8 - ethoxy - 4 - quinaldyl) - 1,6 - hexanediamine.

N,N' - bis - (7 chloro - 8 - methyl - 4 - quinaldyl) - 1,6-hexanediamine.

N,N' - bis - (6 - chloro - 8 - methyl - 4 - quinaldyl)-1,6-hexanediamine.

N,N' - bis - (8 - mercaptomethyl - 4 - quinaldyl) - 1,6-hexanediamine.

N,N' - bis - (5 - chloro - 4 - quinaldyl) - 1,6 - hexanediamine.

N,N' - bis - (5 - methoxy - 4 - quinaldyl) - 1,6 - hexanediamine.

N,N' - bis - (7 - chloro - 4 - quinaldyl) - 1,6 - hexanediamine.

N,N' - bis - (7 - methoxy - 4 - quinaldyl) - 1,6 - hexanediamine.

N,N' - bis - (3 - methyl - 6 - chloro - 4 - quinolyl) - 1,6-hexanediamine.

N,N' - bis - ( 3 - methyl - 8 - methoxy - 4 - quinolyl)-1,6-hexanediamine.

The following examples are included for the purpose of describing the invention in detail but it should be understood that they are not intended to be a limitation on the invention in any way.

EXAMPLE I

*N,N'-bis-(6-methoxy-4-quinaldyl)-1,6-hexanediamine dimethosulfate*

The free base N,N'-bis-(6-methoxy-4-quinaldyl)-1,6-hexanediamine is prepared by precipitation with concentrated ammonium hydroxide from a hot solution of the corresponding dihydrochloride. After drying at 60° to constant weight, 7.5 g. is suspended in 250 ml. of dry toluene and 100 ml. of nitrobenzene. Approximately 150 ml. of toluene is then distilled to remove the residual moisture. To the residue, now under reflux, is added 4.5 g. of dimethylsulfate and the mixture stirred and heated at the boiling point for one hour. On cooling, the solution is poured into 500 ml. of ether and a few drops of water added to assist crystallization of the salt. The solid is filtered, washed well with acetone and recrystallized from 175 ml. of water. The yield of colorless needles of N,N'-bis-(6-methoxy-4-quinaldyl)-1,6-hexanediamine dimethosulfate is 8.9 g.

Analysis calculated for $C_{32}H_{46}N_4O_{10}S_2 \cdot 2H_2O$: C, 51.46; H, 6.75; N, 7.50; S, 8.59. Found: C, 51.85; H, 6.32; N, 7.31; S, 8.67.

The corresponding dimethochloride is prepared by recrystallization of the above dimethosulfate from water containing sodium chloride, and then recrystallization from water.

Analysis calculated for $C_{30}H_{40}Cl_2N_4O_2 \cdot 2H_2O$: C, 60.51; H, 7.44; N, 9.41. Found: C, 61.08; H, 7.24; N, 9.38.

EXAMPLE II

*N,N'-bis-(6-methoxy-4-quinaldyl)-1,7-heptanediamine dimethosulfate*

Following the procedure of Example I, from 4.0 g. of suitable base and 2.4 g. of dimethylsulfate, after recrystallization from water, there is obtained 3.9 g. of N,N'-bis-(6-methoxy-4-quinaldyl)-1,7-heptanediamine dimethosulfate.

Analysis calculated for $C_{33}H_{48}N_4O_{10}S_2$: C, 54.68; H, 6.67; N, 7.73; S, 8.85. Found: C, 54.67; H, 6.73; N, 7.44; S, 9.39.

The corresponding dimethobromide is prepared from the foregoing quaternary salt by exchange with sodium bromide solution.

Analysis calculated for $C_{30}H_{40}Br_2N_4O_2 \cdot 2H_2O$: C, 51.3; H, 6.60; N, 7.98; Br, 22.8. Found: C, 50.73; H, 6.36; N, 7.73; Br, 22.43.

EXAMPLE III

*N,N'-bis-(6-methoxy-4-quinaldyl)-1,4-butanediamine dimethosulfate*

Following the procedure of Example I, from 3.8 g. of suitable base and 2 ml. of dimethylsulfate, there is obtained 5.7 g. of N,N'-bis-(6-methoxy-4-quinaldyl)-1,4-butanediamine dimethosulfate.

Analysis calculated for $C_{30}H_{42}O_{10}S_2 \cdot 2H_2O$: C, 50.12; H, 6.45; N, 7.79; S, 8.92. Found: C, 50.32; H, 6.48; N, 7.86; S, 9.02.

The corresponding dimethochloride is prepared by recrystallizing the dimethosulfate from water containing sodium chloride.

Analysis calculated for $C_{28}H_{36}Cl_2N_4O_2 \cdot 6H_2O$: C, 52.5; H, 7.73; N, 8.75; Cl, 11.1; O, 20.0. Found: C, 53.2; H, 7.37; N, 9.18; Cl, 11.2; O, 19.0.

EXAMPLE IV

*N,N'-bis-(6-methoxy-4-quinaldyl)-1,6-hexanediamine diethosulfate*

Employing the procedure of Example I, from 4.6 g. of suitable base and 2.9 ml. of diethylsulfate, there is obtained 3.8 g. of N,N'-bis-(6-methoxy-4-quinaldyl)-1,6-hexanediamine diethosulfate.

Analysis calculated for $C_{36}H_{54}N_4O_{10}S_2 \cdot 3H_2O$: C, 52.66; H, 7.37; N, 6.82; S, 7.81. Found: C, 52.62; H, 7.00; N, 7.08; S, 8.18.

In like manner the 1,1'-bis-dimethosulfate quaternary salts of the following tertiary bases are obtained:

N,N' - bis - (2 - methyl - 6 - methoxy - 4 - quinolyl) - 1,4-butanediamine.

N,N' - bis - (2 - methyl - 6 - methoxy - 4 - quinolyl) - heptamethylenediamine.

N,N' - bis - (2 - methyl - 6 - methoxy - 4 - quinolyl) - octamethylenediamine.

N,N' - bis - (2 - methyl - 6 - methoxy - 4 - quinolyl) - nonamethylenediamine.

N,N' - bis - (2 - methyl - 6 - methoxy - 4 - quinolyl) - decamethylenediamine.

EXAMPLE V

*N,N'-bis-(6-ethoxy-4-quinaldyl)-1,6-hexanediamine dimethosulfate*

Employing the method of Example I, from 7.3 g. of suitable base and 3.2 ml. of dimethylsulfate, there is obtained 10.0 g. of N,N'-bis-(6-ethoxy-4-quinaldyl)-1,6-hexanediamine dimethosulfate.

Analysis calculated for $C_{34}H_{50}N_4O_{10}S_2$: C, 52.7; H, 7.02; N, 7.22; S, 8.28. Found: C, 53.4; H, 7.07; N, 7.42; S, 8.0.

EXAMPLE VI

*N,N'-bis-(6-chloro-4-quinaldyl)-1,6-hexanediamine dimethosulfate*

As in Example I, from 9.3 g. of suitable base and 5.5 g. of dimethylsulfate, there is obtained 10.0 g. of N,N'-bis-(6-chloro-4-quinaldyl)-1,6-hexanediamine dimethosulfate.

Analysis calculated for $C_{30}H_{40}Cl_2N_4O_8S_2 \cdot 2H_2O$: C, 47.67; H, 5.87; N, 7.41. Found: C, 47.66; H, 5.40; N, 8.15.

EXAMPLE VII

*N,N'-bis-(8-methoxy-4-quinaldyl)-1,6-hexanediamine dimethosulfate*

As in preceding examples, from 7.1 g. of suitable base and 3.2 ml. of dimethylsulfate, there is obtained 6.5 g. of N,N'-bis-(8-methoxy-4-quinaldyl)-1,6-hexanediamine dimethosulfate.

Analysis calculated for $C_{32}H_{42}N_4O_{10}S_2$: C, 51.46; H, 6.75; N, 7.50; S, 8.59. Found: C, 50.91; H, 6.07; N, 7.84; S, 8.53.

EXAMPLE VIII

*N,N'-bis-(8-methoxy-4-quinaldyl)-1,6-hexanediamine diethiodide*

As in Example I, from 3.5 g. of suitable base and 2.2 ml. of diethylsulfate, there is obtained 1.8 g. of the salt N,N'-bis-(8-methoxy-4-quinaldyl)-1,6-hexanediamine diethiodide, after treatment with aqueous sodium iodide by previously described methods.

Analysis calculated for $C_{32}H_{44}I_2N_4O_2$: C, 49.88; H, 5.76; N, 7.27; I, 32.94. Found: C, 49.27; H, 5.87; N, 8.07; I, 33.12.

EXAMPLE IX

*N,N' - bis - (8 - ethoxy-4-quinaldyl)-1,6 - hexanediamine dimethosulfate*

As in Example I, from 4.6 g. of suitable base and 2.8 ml. of dimethylsulfate, there is obtained 4.5 g. of N,N'-bis - (8-ethoxy-4-quinaldyl)-1,6-hexanediamine dimethosulfate.

Analysis calculated for $C_{34}H_{50}N_4O_{10}S_2 \cdot 4H_2O$: C, 50.35; H, 7.09; N, 6.91. Found: C, 50.59; H, 7.14; N, 6.88.

The corresponding dimethiodide is made by previously described methods.

Analysis calculated for $C_{32}H_{44}I_2N_4O_2 \cdot 2H_2O$: C, 47.65; H, 6.00; N, 6.95. Found: C, 47.63; H, 5.50; N, 6.80.

EXAMPLE X

*N,N' - bis - (5,8-dimethoxy)-4-quinaldyl)-1,6-hexanediamine dimethosulfate*

As in Example I, from 6.8 g. of suitable base and 2.7 ml. of dimethylsulfate, there is obtained 9.8 g. of N,N'-bis - (5,8-dimethoxy-4-quinaldyl)-1,6-hexanediamine dimethosulfate.

Analysis calculated for $C_{34}H_{50}N_4O_{12}S_2$: C, 52.97; H, 6.54; N, 7.27; S, 8.32. Found: C, 53.13; H, 6.66; N, 7.24; S, 8.10.

The corresponding dimethiodide is also prepared by described methods.

Analysis calculated for $C_{32}H_{44}I_2N_4O_4 \cdot 2H_2O$: C, 45.83; H, 5.77; N, 6.68. Found: C, 45.80; H, 5.52; N, 6.68.

EXAMPLE XI

*N,N' - bis - (8-methoxy-4-quinaldyl)-1,8-octanediamine dimethiodide*

As in Example I, from 5.8 g. of suitable base and 2.9 g. of dimethylsulfate, there is obtained the dimethosulfate salt of said base which is converted to the dimethiodide by methods previously described herein.

Analysis calculated for $C_{32}H_{40}I_2N_4O_2$: C, 50.14; H, 5.26; N, 7.31. Found: C, 50.56; H, 6.28; N, 7.56.

EXAMPLE XII

*N,N' - bis - (8 - chloro-4-quinaldyl)-1,6-hexanediamine dimethosulfate*

As in Example I, from 9.3 g. of suitable base and 5.5 g. of dimethylsulfate, there is obtained 12.0 g. of N,N'-bis - (8-chloro-4-quinaldyl)-1,6-hexanediamine dimethosulfate.

Analysis calculated for $C_{30}H_{40}Cl_2N_4S_2O_8$: C, 50.06; H, 5.62; N, 7.79. Found: C, 50.64; H, 5.69; N, 8.35.

EXAMPLE XIII

*N,N' - bis - (8 - chloro-4-quinaldyl)-1,6-hexanediamine diethosulfate*

As in Example I, from 5.0 g. of suitable base and 3.7 g. of diethylsulfate, there is obtained 2.0 g. of N,N'-bis-(8-chloro-4-quinaldyl)-1,6-hexanediamine diethosulfate.

Analysis calculated for $C_{30}H_{38}Cl_2I_2N_4$: C, 46.20; H, 4.91; N, 7.19. Found: C, 46.23; H, 4.93; N, 7.00.

EXAMPLE XIV

*N,N' - bis - (5-chloro-8-methyl-4-quinaldyl)-1,6-hexanediamine dimethiodide*

As in the preceding examples, from 9.9 g. of suitable base and 5.5 g. of methylsulfate, after conversion with sodium iodide, there is obtained 7.8 g. of N,N'-bis-(5-chloro - 8-methyl-4-quinaldyl)-1.6-hexanediamine dimethiodide.

Analysis calculated for $C_{30}H_{38}Cl_2I_2N_4 \cdot H_2O$: C, 45.18; H, 5.06; N, 7.03. Found: C, 44.78; H, 5.30; N, 7.31.

EXAMPLE XV

*N,N' - bis - (8 - bromo-4-quinaldyl)-1,6-hexanediamine dimethosulfate*

As in the preceding examples, from 6.2 g. of suitable base and 2.3 ml. of dimethylsulfate, there is obtained 4.7 g. of N,N'-bis-(8-bromo-4-quinaldyl)-1,6-hexanediamine dimethosulfate.

Analysis calculated for $C_{30}H_{40}Br_2N_4O_8S_2$: C, 44.56; H, 4.99; N, 6.93; S, 7.93. Found: C, 44.36; H, 5.02; N, 6.97; S, 7.93.

EXAMPLE XVI

*N,N' - bis - (5-chloro-8-methoxy-4quinaldyl) - 1,6 - hexanediamine dimethiodide*

As in the preceding examples, from 5.9 g. of suitable base and 2.2 ml. of dimethylsulfate, there is obtained 7.6 g. of N,N'-bis-(5-chloro-8-methoxy-4-quinaldyl)-1,6-hexanediamine dimethiodide.

Analysis calculated for $C_{30}H_{38}Cl_2I_2N_4O_2 \cdot 2H_2O$: C, 42.52; H, 5.00; N, 6.61. Found: C, 42.89; H, 4.94; N, 6.61.

EXAMPLE XVII

*N,N' - bis - (4-quinaldyl) - 1,6 - hexanediamine dimethosulfate*

As in preceding examples, from 8.0 g. of suitable base and 5.1 g. of dimethylsulfate, there is obtained 9.1 g. of N,N'-bis-(4-quinaldyl)-1,6-hexanediamine dimethosulfate.

Analysis calculated for $C_{30}H_{42}N_4O_8S_2 \cdot H_2O$: C, 53.87; H, 6.63; N, 8.38. Found: C, 54.77; H, 6.59; N, 8.39.

This application is a continuation-in-part of my co-pending applications Serial No. 579,742, filed April 23, 1956, now abandoned, and Serial No. 471,518, filed November 26, 1954, now abandoned, which latter was a continuation-in-part of application Serial No. 364,467, filed June 26, 1953, now abandoned.

Others may practice the invention in any of the numerous ways which will be suggested to one skilled in the art. It is contemplated that all such practice will be covered by the invention provided it falls within the scope of the appended claims.

I claim:

1. Chemical compounds having the formula

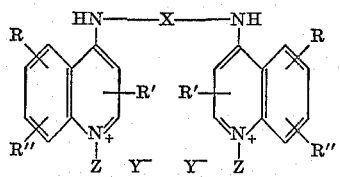

wherein X is a member selected from the group consisting of phenyl, cyclohexyl, —$CH_2$—CHOH—$CH_2$—, and an alkylene group having from 2 to 12 carbon atoms inclusive; R is a member selected from the group consisting of hydrogen, halogen, and lower alkoxy; R' is a member selected from the group consisting of hydrogen and lower alkyl; R" is a member selected from the group consisting of hydrogen, halogen, and lower alkoxy; Y is an anion and Z is a lower alkyl group.

2. N,N' - bis - (5,8-dimethoxy-4-quinaldyl)-1,6-hexanediamine dimethiodide.

3. N,N'-bis-(5-chloro-8-methoxy-4-quinaldyl)-1,6-hexanediamine dimethiodide.

4. N,N'-bis(6-methoxy - 4 - quinaldyl) - 1,6 - hexanediamine dimethiodide.

5. N,N'-bis-(8 - chloro-4-quinaldyl)-1,6-hexanediamine dimethiodide.

6. N,N'-bis-(8 - methoxy-4-quinaldyl) - 1,6 - hexanediamine dimethiodide.

7. Quaternary salts having the formula

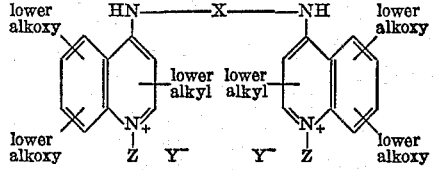

wherein X is an alkylene group having 2 to 12 carbon atoms inclusive; Y is an anion and Z is a lower alkyl group.

8. Quaternary salts having the formula

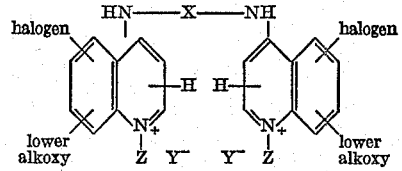

wherein X is an alkylene group having 2 to 12 carbon atoms inclusive; Y is an anion and Z is lower alkyl.

9. Quaternary salts having the formula

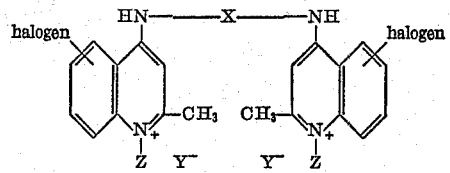

wherein X is an alkylene group having 2 to 12 carbon atoms inclusive; Y is an anion and Z is lower alkyl.

10. Quaternary salts having the formula

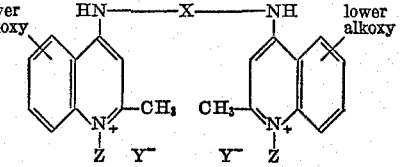

wherein X is an alkylene group having 2 to 12 carbon atoms inclusive; Y is an anion and Z is lower alkyl.

No references cited.

UNITED STATES PATENT OFFICE
Certificate of Correction

Patent No. 2,901,484

August 25, 1959

Richard U. Schock

It is hereby certified that error appears in the printed specification of the above numbered patent requiring correction and that the said Letters Patent should read as corrected below.

Column 3, line 32, Example III, for the empirical formula "$C_{30}H_{42}O_{10}S_2.2H_2O$" read —$C_{30}H_{42}N_4O_{10}S_2.2H_2O$—; column 5, Example XVI, for that portion of the title reading "-*4quinaldyl*)-" read — -*4-quinaldyl*)- —; column 6, line 24, for "-bis(6-methoxy-4-" read — -bis-(6-methoxy-4- —.

Signed and sealed this 15th day of March 1960.

[SEAL]

Attest:
KARL H. AXLINE,
*Attesting Officer.*

ROBERT C. WATSON,
*Commissioner of Patents.*